United States Patent
Mamyshev

[19]

[11] Patent Number: 6,072,615
[45] Date of Patent: Jun. 6, 2000

[54] PHASE MODULATOR-BASED GENERATION OF HIGH-QUALITY HIGH BIT RATE RETURN-TO-ZERO OPTICAL DATA STREAMS

[75] Inventor: Pavel V. Mamyshev, Middletown, N.J.

[73] Assignee: Lucent Technologies Inc., Murray Hill, N.J.

[21] Appl. No.: 08/874,891

[22] Filed: Jun. 13, 1997

[51] Int. Cl.[7] .................................................. H04B 10/04
[52] U.S. Cl. ......................... 359/183; 359/181; 359/184
[58] Field of Search ................................... 359/183, 184, 359/181, 186, 180

[56] References Cited

U.S. PATENT DOCUMENTS

| | | | |
|---|---|---|---|
| 5,317,443 | 5/1994 | Nishimoto | 359/181 |
| 5,392,147 | 2/1995 | Kaede et al. | 359/183 |
| 5,432,631 | 7/1995 | Mamyshev . | |
| 5,473,458 | 12/1995 | Mamyshev et al. . | |
| 5,477,375 | 12/1995 | Korotky et al. | 359/183 |
| 5,541,755 | 7/1996 | Noe et al. | 359/183 |
| 5,625,722 | 4/1997 | Froberg et al. | 359/184 |
| 5,828,478 | 10/1998 | Thomine et al. | 359/183 |

OTHER PUBLICATIONS

L.F. Mollenauer, P.V. Mamyshev and M.J. Neubelt, "Measurement of timing jitter in filter-guided soliton transmission at 10 Gbits/sec and achievement of 375 Gbits/s-Mm, error-free, at 12.5 and 15 Gbits/sec," Optics Letters, vol. 19, No. 10, pp. 704–706, May 1994.

N.M. Froberg et al., "Integrated data encoding of a 5-Gbit/sec soliton pulse train using a laser/modulator transmitter," Technical Digest of the Optical Fiber Communication Conference, 1995 OSA Technical Digest Series, vol. 8, paper Tu15, pp. 40–41, OSA, Washington DC, 1995.

P.V. Mamyshev, "Dual-wavelength source of high-repetition-rate, transform-limited optical pulses for soliton transmission," Optics Letters, vol. 19, No. 24, pp. 2074–2076, Dec. 1994.

P.V. Mamyshev and L.F. Mollenauer, "NRS-to-soliton data conversion by a filtered transmission line," OFC '95 Technical Digest, vol. 8, Paper FB2, pp. 302–303, 1995.

*Primary Examiner*—Jeffery A. Hofsass
*Assistant Examiner*—John Tweel, Jr.

[57] ABSTRACT

Apparatus and method for generating a return-to-zero (RZ) optical data stream. A laser or other continuous wave (CW) optical source generates an optical carrier signal which is applied to a phase modulator. A return-to-zero data generator multiplies a non-return-to-zero (NRZ) electrical data stream and a sinusoidal electrical signal to generate an RZ electrical data stream. The phase modulator modulates the RZ electrical data stream onto the optical carrier signal to generate a phase-modulated optical signal. A Stokes portion or an anti-Stokes portion of the phase-modulated optical signal spectrum is then spectrally separated in an optical filter to provide a corresponding output RZ optical data stream. The spectral separation may be provided using a discrete filter coupled to the output of the phase modulator, or using transmission line filtering in a soliton transmission system. The use of the phase modulator to perform data encoding operations avoids the modulation bias drift problems inherent in amplitude modulators.

20 Claims, 6 Drawing Sheets

TIME, t/T

FIG. 4B

TIME, t/T

FREQUENCY, $\delta\omega T/(2\pi)$

PHASE MODULATOR-BASED GENERATION OF HIGH-QUALITY HIGH BIT RATE RETURN-TO-ZERO OPTICAL DATA STREAMS

FIELD OF THE INVENTION

The present invention relates generally to high-speed optical data transmitters for use in optical communication systems, and more particularly to techniques for using a phase modulator to generate a high bit rate return-to-zero (RZ) optical data stream.

BACKGROUND OF THE INVENTION

Long-distance optical data transmission at bit rates on the order of 10 Gbits/sec or more often utilize optical data streams configured in a return-to-zero (RZ) format. For example, soliton data transmission applications require the generation of optical pulses that have a hyperbolic secant pulse shape or another predetermined pulse shape. In soliton transmission, the optical pulse shape is selected such that effects of wavelength-dependent negative group velocity dispersion experienced by the pulse as it travels along an optical fiber are exactly offset by effects of intensity-dependent self-phase modulation attributable to the Kerr nonlinearity. This balancing of group velocity dispersion and self-phase modulation allows the optical pulse to propagate over very long lengths of fiber while maintaining its original pulse shape. Generation of optical pulses for soliton transmission and other high bit rate applications typically requires a high-quality optical data transmitter. The optical data transmitter should be capable of generating an optical data stream in which there is no "pedestal" between adjacent pulses, and in which the pulses are substantially transform limited.

One type of conventional optical data transmitter for generating high-quality RZ optical data streams includes a laser or other optical source which generates a periodic optical pulse train at the required bit rate, and a chirp-free amplitude modulator which encodes a stream of data onto the optical pulse train. Such a transmitter is described in greater detail in L. F. Mollenauer, P. V. Mamyshev and M. J. Neubelt, "Measurement of timing jitter in filter-guided soliton transmission at 10 Gbits/sec and achievement of 375 Gbits/s-Mm, error-free, at 12.5 and 15 Gbits/sec," Optics Letters, Vol. 19, No. 10, pp. 704–706, May 1994, which is incorporated by reference herein. In another type of conventional RZ optical data transmitter, a continuous wave (CW) laser drives an amplitude modulator which also receives an RZ electrical data stream as an input modulation signal. The amplitude modulator utilizes the RZ electrical data stream to provide both pulse shaping and data encoding for the CW laser output. This type of transmitter is described in greater detail in N. M. Froberg et al., "Integrated data encoding of a 5-Gbit/sec soliton pulse train using a laser/modulator transmitter," Technical Digest of the Optical Fiber Communication Conference, 1995 OSA Technical Digest Series, Vol. 8, paper Tu15, pp. 40–41, OSA, Washington D.C., 1995, which is incorporated by reference herein. A significant problem with these and other RZ optical data transmitters which rely on the use of an amplitude modulator for pulse shaping and/or data encoding functions relates to the bias setting of the amplitude modulator. The bias setting has a tendency to drift over time, and the transmitter may therefore be unable to maintain the desired pulse shape and other characteristics for the resulting output RZ optical pulses. This undesirable variation in the transmitter output pulses as a function of time can severely undermine performance in soliton transmission systems and other high bit rate optical data transmission systems.

It is therefore apparent that a need exists for a technique for generating high-quality, high bit rate RZ optical pulses without the need for a separate amplitude modulator, and thus without the modulator bias problems associated with the above-described conventional techniques.

SUMMARY OF THE INVENTION

The present invention generates a return-to-zero (RZ) optical data stream using a phase modulator to perform data encoding operations, rather than an amplitude modulator as in conventional techniques, and thereby avoids the problems associated with amplitude modulator bias drift. An illustrative embodiment of the invention includes a continuous wave (CW) laser or other optical source for generating an optical carrier signal, and an RZ data generator for generating an RZ electrical data stream. The phase modulator modulates the RZ electrical data stream onto the optical carrier signal to generate a phase-modulated optical signal, and a Stokes or anti-Stokes portion of the phase-modulated optical signal spectrum is spectrally separated to provide a corresponding RZ optical data stream. The spectral separation may be provided by a discrete filter coupled to the output of the phase modulator, or by transmission line filtering in a soliton transmission system or other suitable transmission system. Two distinct RZ optical data streams may be generated by using filters to spectrally separate both the Stokes and the anti-Stokes portions of the phase-modulated optical signal spectrum.

An illustrative RZ electrical data stream generator in accordance with the invention includes an electrical signal source for generating a bit-rate periodic sinusoidal signal, and a data source for generating a non-return-to-zero (NRZ) electrical data stream. The sinusoidal signal and NRZ electrical data stream are supplied as inputs to a multiplier which generates an RZ electrical data stream suitable for application to the above-noted phase modulator. Other types of RZ data generators, providing a variety of different RZ electrical signal shapes, may also be used to generate an RZ electrical data stream suitable for application to the phase modulator.

The use of a phase modulator to perform RZ data encoding operations completely avoids the modulation bias drift problems inherent in amplitude modulators. A phase modulator-based optical data transmitter configured in accordance with the invention can provide an RZ optical data stream at data bit rates on the order of 10 Gbits/sec or more, and can be used to generate pulses suitable for soliton transmission and other important high bit rate optical transmission applications. These and other features and advantages of the present invention will become more apparent from the accompanying drawings and the following detailed description.

DETAILED DESCRIPTION OF THE INVENTION

The following description will illustrate the present invention using an exemplary RZ optical pulse generator. It should be understood, however, that the invention is not limited to use with any particular type of RZ generator. The invention is more generally applicable to any optical pulse generator in which it is desirable to generate an RZ optical data stream without directly amplitude modulating the optical pulse stream. The terms "return-to-zero" and "RZ" are intended to include optical and electrical pulses having shapes other than the exemplary pulse shapes shown herein for purposes of illustration. The term "optical pulse" is intended to include an optical pulse having any shape appropriate for a given application, such as a hyperbolic secant pulse in a soliton transmission application.

The present invention provides a technique for generating a high-quality RZ optical data stream without the need for a separate amplitude modulator. The invention provides both pulse shaping and data encoding functions using a phase modulator, and thereby avoids the amplitude modulator bias drift problems associated with the previously-described conventional data transmitters. Prior art optical data transmitters which utilize phase modulators are described in, for example, P. V. Mamyshev, "Dual-wavelength source of high-repetition-rate, transform-limited optical pulses for soliton transmission," Optics Letters, Vol. 19, No. 24, pp. 2074–2076, December 1994, and U.S. Pat. No. 5,432,631, entitled "Dual-Wavelength Source of High-Repetition Rate, Transform-Limited Optical Pulses" and issued Jul. 11, 1995 to P. V. Mamyshev, both of which are incorporated by reference herein. These prior art phase modulator-based transmitters generally utilize a phase modulator and an optical filter which act to create uniform trains of transform-limited pulses from the output of a CW optical source, such that an amplitude modulator may then be used to encode data on the pulses. The present invention, as will be described in greater detail below, applies an RZ electrical signal to a modulation signal input of a phase modulator, such that the phase modulator output can be filtered to provide a modulated RZ optical data stream. The invention thus completely eliminates the need for an optical amplitude modulator, and thereby avoids the bias drift problem altogether.

Figure 1:
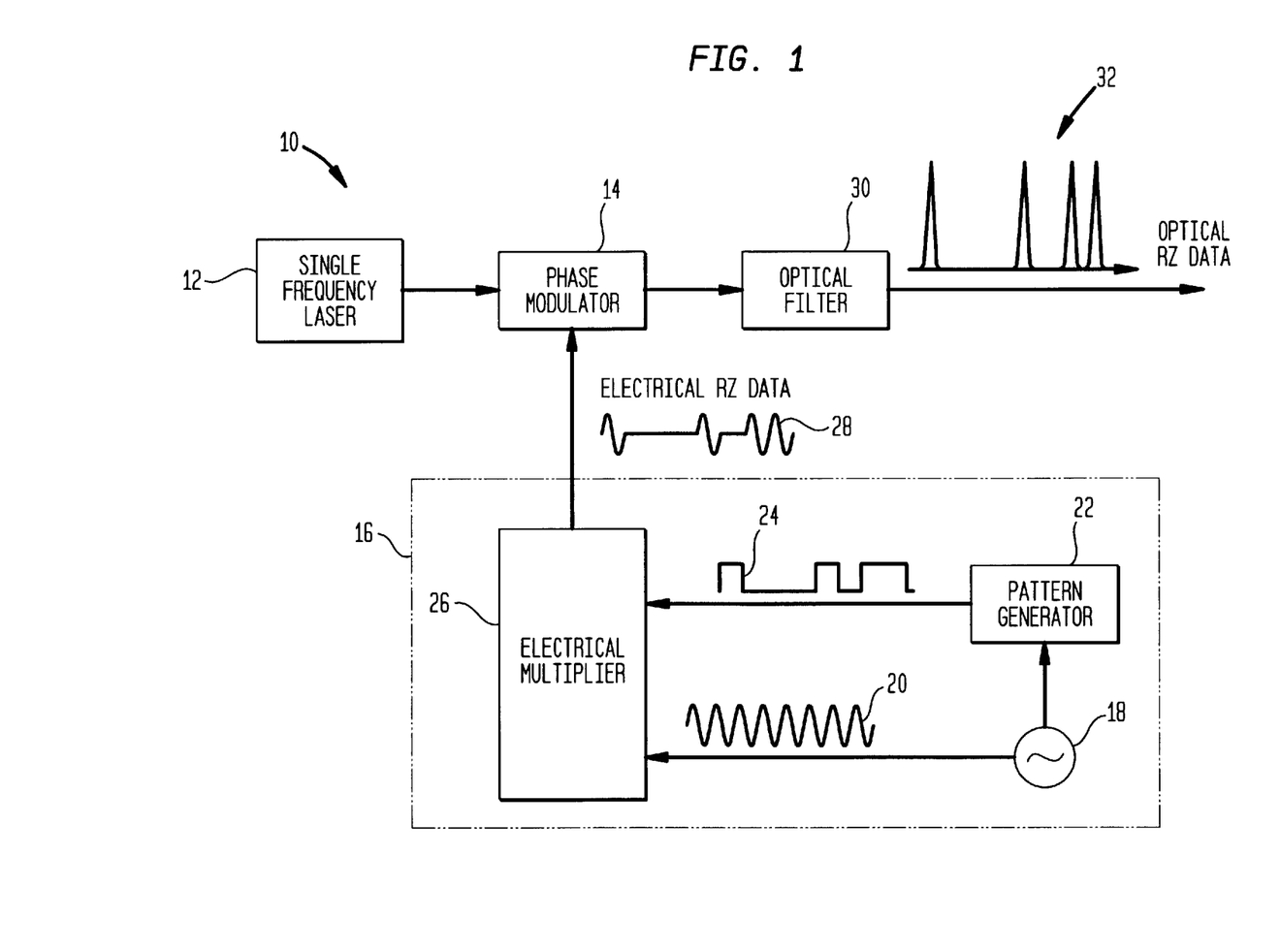
FIG. 1 shows a block diagram of an exemplary RZ optical data transmitter in accordance with the invention.

FIG. 1 shows a block diagram of an exemplary RZ optical data transmitter 10 in accordance with the invention. The optical data transmitter 10 includes a CW optical source which in this embodiment is a single-frequency laser 12. The laser 12 supplies a CW optical signal to an optical signal input of a phase modulator 14. The data transmitter 10 further includes an electrical RZ data generator 16. The RZ data generator 16 includes a signal generator 18 for generating a sinusoidal electrical signal 20 having a period corresponding to the desired bit rate, a pattern generator 22 for generating a non-return-to-zero (NRZ) electrical data stream 24, and a multiplier 26 which receives as inputs the sinusoidal signal 20 and the NRZ data stream 24. The multiplier 26 multiplies the sinusoidal signal 20 and the data stream 24 to generate an RZ electrical data stream 28 which is supplied to a modulation input of the phase modulator 14. The phase modulator 14 modulates the CW optical signal phase in accordance with the RZ data from the RZ data generator 16 to produce an output optical spectrum which includes Stokes and anti-Stokes portions. An optical filter 30 receives the output of the phase modulator 14 and spectrally separates either the Stokes or anti-Stokes portion of the phase modulator output spectrum to provide an output corresponding to an RZ optical data stream 32.

Figure 2A:
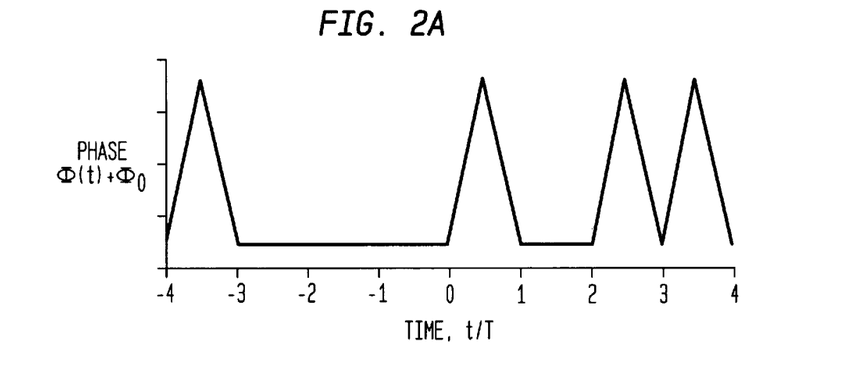
FIGS. 2A and 2B show phase and frequency deviation, respectively, of an optical signal phase modulated by an RZ electrical data stream in the optical data transmitter of FIG. 1 as a function of time.
Figure 2B:
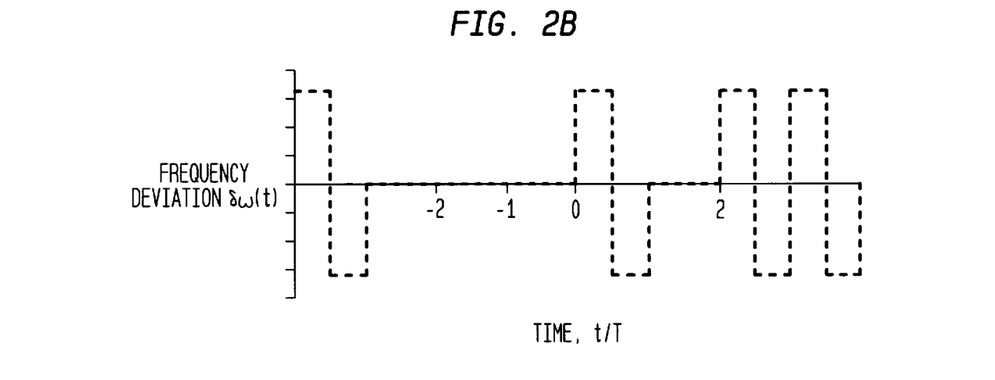

FIGS. 2A and 2B show the phase and frequency deviation, respectively, of the CW optical signal from laser 12 after modulation by the RZ electrical data stream 28 in the phase modulator 14 of FIG. 1. The phase and frequency deviation are shown as a function of normalized time t/T, where T is the bit period. When the electrical RZ data 28 is applied to the modulation input of the phase modulator 14, the CW optical signal acquires the time-dependent phase modulation shown in FIG. 2A and given by:

$$\Phi(t)+\Phi_0, \qquad (1)$$

where $\Phi_0$ is the modulator bias. Correspondingly, the optical carrier frequency deviation $\delta\omega(t)=\omega(t)-\omega_0$ of the modulated CW signal is determined by the time derivative of the phase $\Phi(t)+\Phi_0$, in accordance with the following equation:

$$\delta\omega(t) = \frac{\partial \Phi(t)}{\partial t} \qquad (2)$$

It can be seen from Equations (1) and (2) above that the optical carrier frequency deviation $\delta\omega(t)$, and thus the RZ optical data pulse shape, is independent of and therefore insensitive to the modulation bias $\Phi_0$.

The optical carrier phase $\Phi(t)+\Phi_0$ shown in FIG. 2A includes a number of peaks, each of which indicates the presence of a logic "one" in the RZ data stream used to modulate the optical carrier. The absence of a peak during a particular bit period indicates the presence of a logic "zero" in the RZ data stream. It is apparent from FIG. 2B that the optical carrier frequency remains unchanged for logic "zeros" in the RZ data stream, and it deviates first toward the higher frequency or "blue" ($\delta\omega>0$) spectral region and then toward the lower frequency or "red" ($\delta\omega<0$) spectral region for each logic "one" which is present in the RZ data stream. The term "red" as used herein refers to a shift toward a lower frequency relative to the CW optical carrier frequency, while the term "blue" refers to a shift toward a higher frequency relative to the CW carrier frequency. The red and blue deviations are both measured with respect to the carrier frequency of the CW optical signal, and should not be construed as limiting the invention to particular frequency ranges. The blue-shifted and red-shifted components of the phase modulated optical signal correspond generally to the anti-Stokes and Stokes portions of the modulated optical signal spectrum. By using the optical filter 30 to provide spectral selection of the either the blue-shifted or red-shifted components of the modulated optical signal, the transmitter 10 can provide the RZ optical data stream at the corresponding wavelength.

Figure 2C:
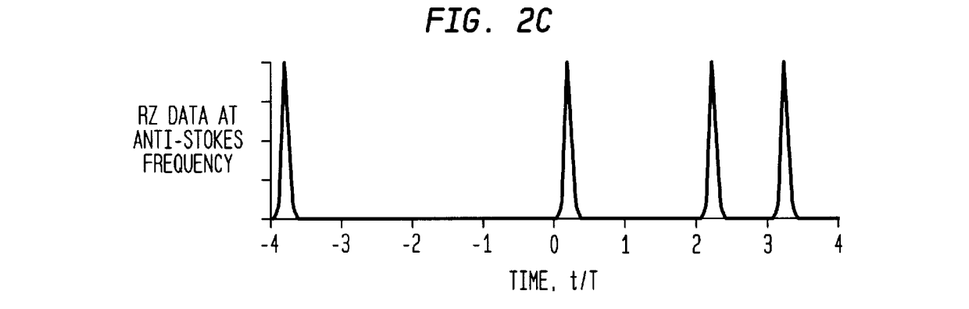
FIGS. 2C and 2D show output RZ optical pulse data streams generated by the FIG. 1 transmitter after spectral selection of anti-Stokes and Stokes sidebands, respectively.
Figure 2D:
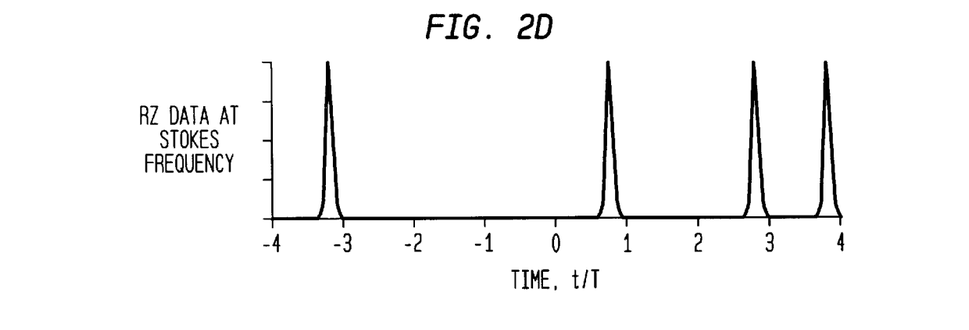

FIGS. 2C and 2D show output RZ optical pulse data streams generated by the transmitter 10 of FIG. 1 after spectral selection in filter 30 of the respective anti-Stokes and Stokes sidebands of the modulated optical signal. The RZ optical data streams are shown as a function of normalized time t/T. The filter 30 may be configured to select either the anti-Stokes portion of the modulated optical signal spectrum, such that the output of transmitter 10 corresponds to the RZ data stream of FIG. 2C, or the Stokes portion of the modulated optical signal spectrum, such that the output of transmitter 10 corresponds to the RZ data stream of FIG. 2D. It should be noted that alternative embodiments of the transmitter 10 may utilize two optical filters, one for separating the anti-Stokes spectrum and another for separating the Stokes spectrum, such that two separate RZ data streams are produced.

Figure 3A:
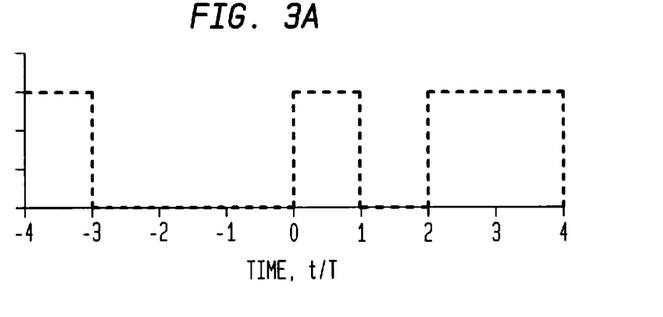
FIG. 3A shows an exemplary non-return-to-zero (NRZ) electrical data stream which may be generated by the pattern generator of the FIG. 1 transmitter.
Figure 3B:
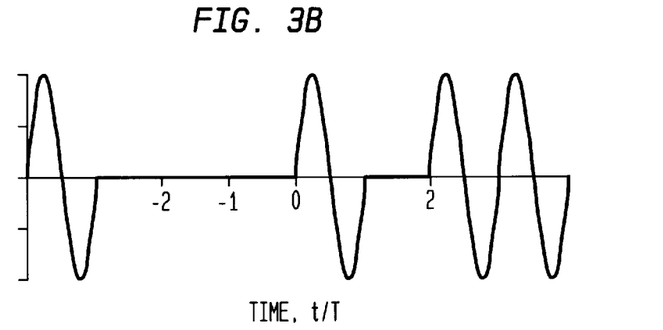
FIGS. 3B through 3D show examples of different RZ electrical signals obtained by multiplication of the NRZ signal of FIG. 3A with different sinusoidal signals in the multiplier of the FIG. 1 transmitter.
Figure 3C:
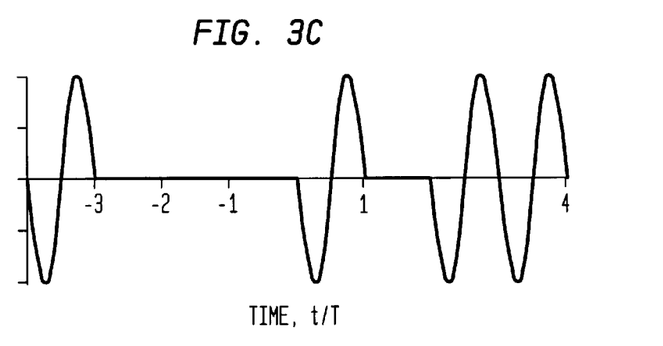
Figure 3D:
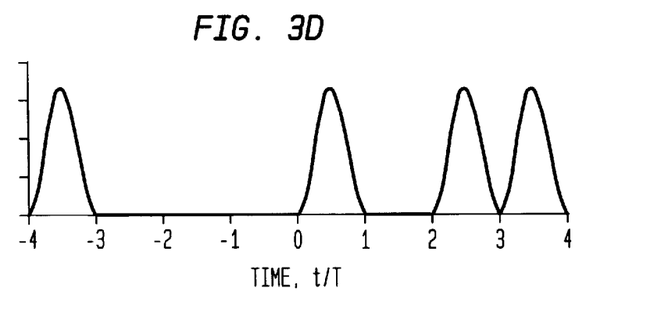

FIG. 3A shows an exemplary NRZ electrical data stream 24 which may be generated by the pattern generator 22 of the transmitter 10. As noted above, the RZ electrical data stream 28 may be generated by multiplying the NRZ electrical data stream 24 with a bit-rate periodic sinusoidal signal 20 from signal generator 18. FIGS. 3B through 3D show examples of different RZ electrical signals obtained by multiplication of the NRZ signal of FIG. 3A with different sinusoidal signals in the multiplier 26 of transmitter 10. The signals in FIGS. 3A through 3D are shown as a function of normalized time t/T. The RZ electrical signal shown in FIG. 3B may be used for generating the red-shifted or Stokes component RZ optical data stream of FIG. 2D, while the RZ electrical signal shown in FIG. 3C may be used for generating the blue-shifted or anti-Stokes component RZ optical data stream of FIG. 2C. The RZ electrical signal of FIG. 3D may be used to generate an optical data stream generation at either or both of the red-shifted and blue-shifted frequencies. The multiplication of the electrical NRZ signal 24 and periodic sinusoidal signal 20 in multiplier 26 may be implemented using, for example, a dual-gate field-effect-transistor (FET) as described in the above-cited N. M. Froberg et al. reference. The pattern generator 22 may be replaced in alternative embodiments with any suitable NRZ data source. Moreover, any of a number of other techniques may be used in RZ data generator 16 to generate the RZ electrical data stream 28.

Figure 4A:
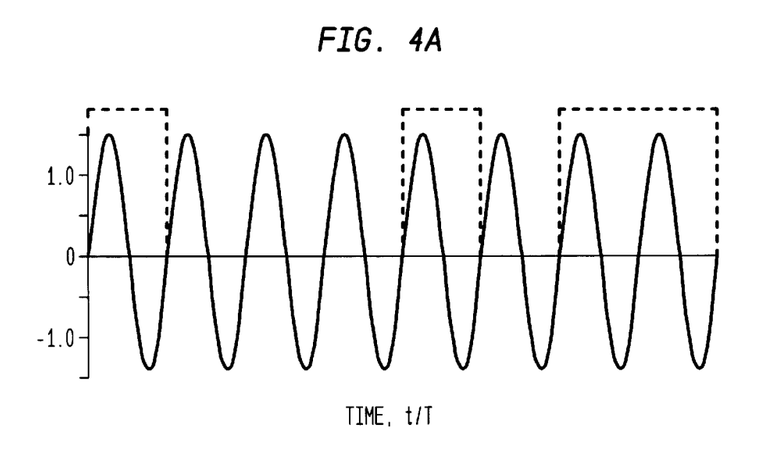
FIG. 4A shows an NRZ electrical data signal and a sinusoidal signal which may be applied to the multiplier of the FIG. 1 transmitter.
Figure 4B:
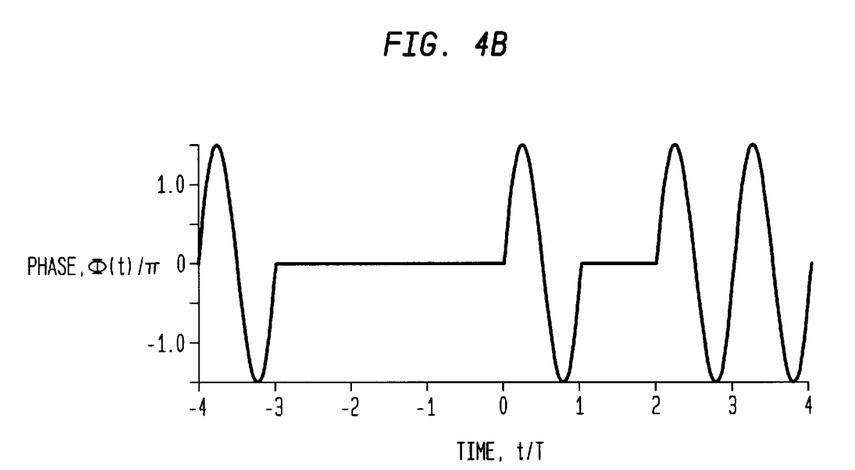
FIG. 4B shows an RZ electrical data stream resulting from multiplication of the signals of FIG. 4A in the multiplier of the FIG. 1 transmitter.

FIGS. 4A–4B, 5A–5B and 6A–6B are based on numerical simulations performed to demonstrate the operation of the above-described illustrative embodiment of the invention. FIG. 4A shows an exemplary NRZ electrical data signal NRZ(t), corresponding to the dashed line, superimposed on an exemplary sinusoidal signal, corresponding to the solid line. FIG. 4B shows the normalized phase $\Phi(t)/\pi$ of an RZ electrical data stream resulting from multiplication of the signals of FIG. 4A in the multiplier 26 of the RZ data generator 16 of FIG. 1. The phase $\Phi(t)$ of the RZ electrical data stream is given by:

$$\Phi(t) = NRZ(t) A \sin\left[\frac{2\pi}{T}t\right] \quad (3)$$

where T is the data bit period, and A is the amplitude of the phase modulation. In an exemplary application in which a 10 Gbits/sec RZ data stream is generated, the bit rate T corresponds to 100 picoseconds.

Figure 5A:
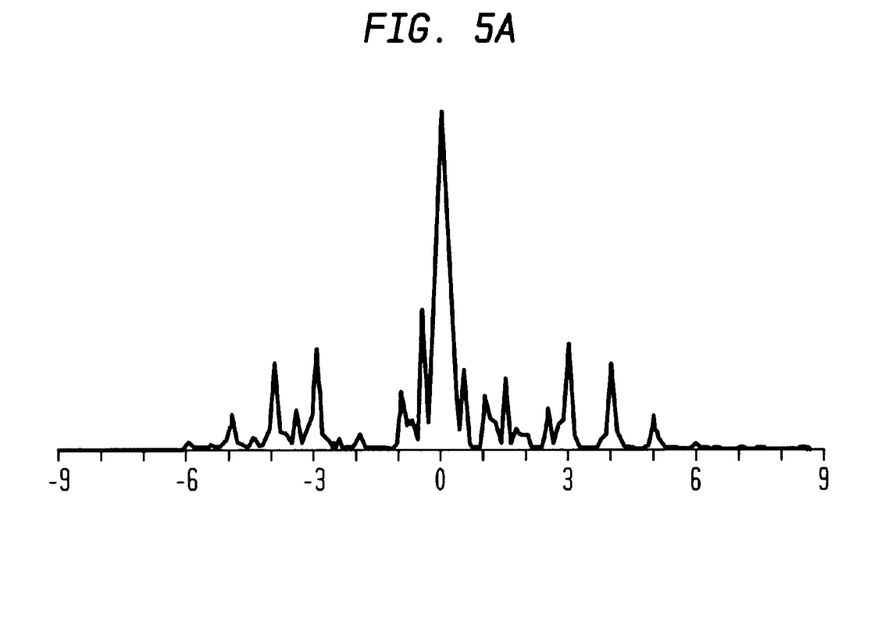
FIG. 5A shows an optical spectrum of a phase-modulated CW optical signal at the output of the phase modulator of the FIG. 1 transmitter.
Figure 5B:
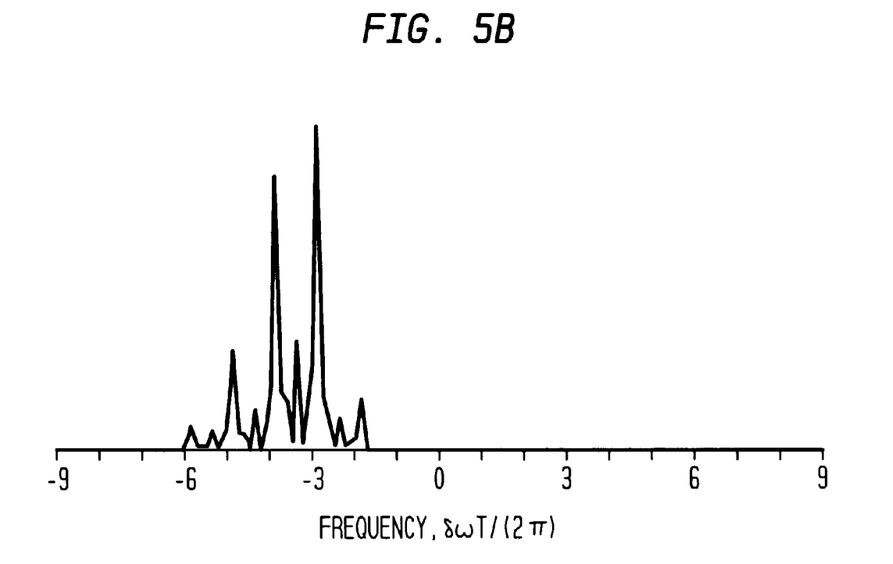
FIG. 5B shows a red-shifted or Stokes portion of the FIG. 5A spectrum at the output of the optical filter of the FIG. 1 transmitter.
Figure 6A:
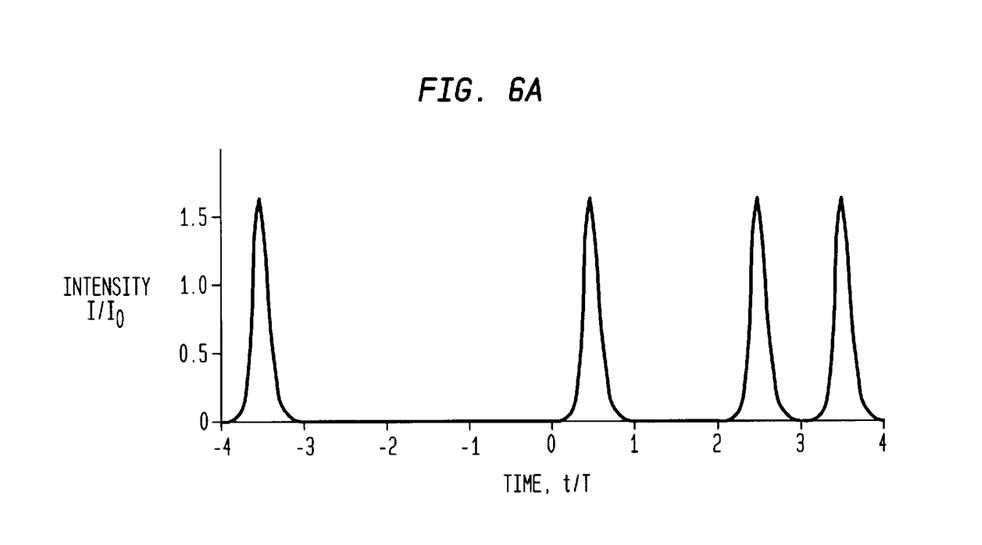
FIGS. 6A and 6B show respective linear and logarithmic plots of the RZ optical data stream corresponding to the spectrum of FIG. 5B.
Figure 6B:
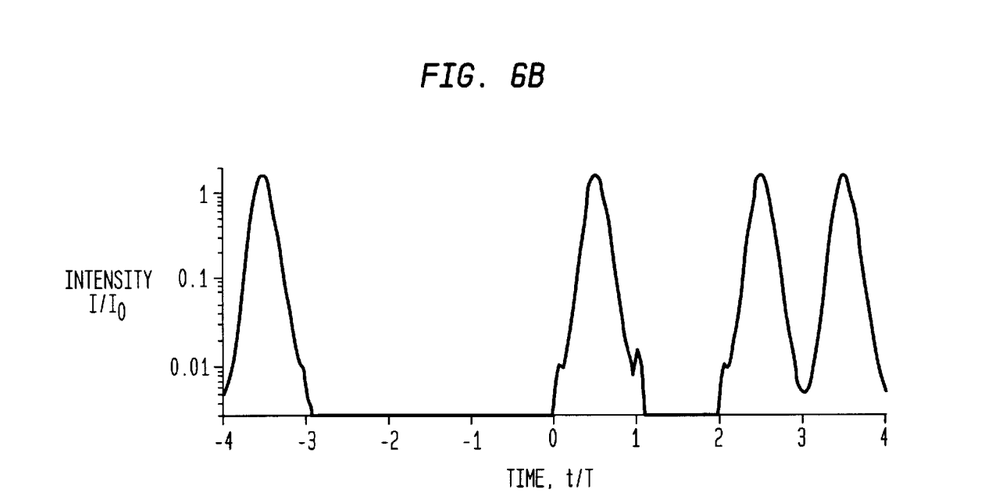

FIG. 5A shows an optical spectrum of a phase-modulated CW optical signal at the output of the phase modulator 14 in the transmitter 10 of FIG. 1, in an embodiment in which the amplitude A of the phase modulation was selected as 1.5 $\pi$. FIG. 5B shows the red-shifted or Stokes portion of the FIG. 5A spectrum at an output of the optical filter 30 in transmitter 10. The filter 30 was configured using a step low-pass frequency filter in order to spectrally separate the red-shifted or Stokes spectral components from the phase modulator output spectrum of FIG. 5A. FIGS. 6A and 6B show respective linear and logarithmic plots of the RZ optical data stream corresponding to the Stokes spectrum of FIG. 5B. It is apparent from FIGS. 6A and 6B that the quality of the generated RZ optical data stream is very high, in that there is no significant pedestal between the pulses, and the pulses are substantially transform-limited. The time-bandwidth product of the pulses in the numerical simulations was on the order of 0.39. The peak intensity of the pulses is approximately 1.7 times higher than the intensity of the unmodulated CW optical signal, and the pulse duration decreases with increasing phase modulation amplitude A. The simulations demonstrate that the present invention may be used to generate RZ optical data streams at bit rates on the order of 10 Gbits/sec or more.

A variety of alternative implementations of the RZ optical data transmitter of FIG. 1 are possible. For example, in an embodiment in which the transmitter is used in a soliton transmission system which includes frequency-guiding filters, the transmission line itself can provide the necessary frequency selection. In such an embodiment, the function of the optical filter 30 immediately following the phase modulator 14 in FIG. 1 is provided by the transmission line rather than by a discrete optical filter. This alternative frequency selection arrangement is of the type described in greater detail in P. V. Mamyshev and L. F. Mollenauer, "NRZ-to-soliton data conversion by a filtered transmission line," OFC '95 Technical Digest, Vol. 8, Paper FB2, pp. 302–303, 1995 OSA Technical Digest Series, Washington D.C., 1995, and U.S. Pat. No. 5,473,458, entitled "Soliton data transmission using non-soliton transmitter," issued Dec. 5, 1995 to P. V. Mamyshev and L. F. Mollenauer. Both of these publications are incorporated by reference herein. In another alternative embodiment, the RZ data generator 16 may be replaced with a different type of RZ data generator. The above-described embodiments of the invention are thus intended to be illustrative only. Numerous other alternative embodiments may be devised by those skilled in the art without departing from the scope of the following claims.

What is claimed is:

1. An apparatus for generating a return-to-zero optical data stream, the apparatus comprising:

an optical source for generating an optical signal;

a phase modulator having an optical signal input coupled to an output of the optical source; and a return-to-zero data generator for generating a return-to-zero electrical data stream, the data generator having an output coupled to a modulation input of the phase modulator, wherein the phase modulator modulates the electrical return-to-zero data stream onto the optical signal generated by the optical source, such that a portion of an output of the phase modulator provides the return-to-zero optical data stream.

2. The apparatus of claim 1 wherein the portion of the output of the phase modulator which provides the return-to-zero optical data stream is a Stokes portion of an output spectrum of the modulator.

3. The apparatus of claim 1 wherein the portion of the output of the phase modulator which provides the return-to-zero optical data stream is an anti-Stokes portion of an output spectrum of the modulator.

4. The apparatus of claim 1 further including an optical filter for filtering the output of the phase modulator to provide the return-to-zero optical data stream.

5. The apparatus of claim 4 wherein the optical filter is implemented as a discrete optical filter.

6. The apparatus of claim 4 wherein the optical filter is provided by a transmission line coupled to the output of the phase modulator.

7. The apparatus of claim 1 wherein the return-to-zero data generator includes:

an electrical signal source;

a non-return-to-zero data source; and a multiplier having a first input coupled to an output of the electrical signal source, a second input coupled to an output of the non-return-to-zero data source, and an output corresponding to the return-to-zero electrical data stream.

8. The apparatus of claim 7 wherein the electrical signal source is a sinusoidal signal source for generating a sinusoidal signal having a period corresponding to the bit rate of the return-to-zero electrical data stream.

9. A method of generating a return-to-zero optical data stream, the method comprising the steps of:

generating an optical signal;

generating a return-to-zero electrical data stream; and phase modulating the electrical return-to-zero data stream onto the optical signal to generate a phase-modulated optical signal, such that a portion of the phase-modulated optical signal provides the return-to-zero optical data stream.

10. The method of claim 9 wherein the portion of the phase-modulated optical signal which provides the return-to-zero optical data stream is a Stokes portion of a spectrum of the phase-modulated optical signal.

11. The method of claim 9 wherein the portion of the phase-modulated optical signal which provides the return-to-zero optical data stream is an anti-Stokes portion of a spectrum of the phase-modulated optical signal.

12. The method of claim 9 further including the step of filtering the phase-modulated optical signal to provide the return-to-zero optical data stream.

13. The method of claim 12 wherein the filtering step includes filtering the phase-modulated optical signal in a discrete optical filter.

14. The method of claim 12 wherein the filtering step includes filtering the phase-modulated optical signal in a transmission line coupled to the phase modulator output.

15. The method of claim 9 wherein the step of generating the return-to-zero electrical data stream includes:

generating an electrical signal;

generating a non-return-to-zero data stream; and multiplying the electrical signal and the non-return-to-zero data stream to generate the return-to-zero electrical data stream.

16. The method of claim 15 wherein the step of generating an electrical signal includes generating a sinusoidal signal having a period corresponding to the bit rate of the return-to-zero electrical data stream.

17. A communication system in which a return-to-zero optical data stream is generated for transmission over an optical fiber to a receiver, the system comprising:

a return-to-zero optical data transmitter for generating the return-to-zero optical data stream for transmission to the receiver, the data transmitter including an optical source for generating an optical signal, a phase modulator having an optical signal input coupled to an output of the optical source, and a return-to-zero data generator for generating a return-to-zero electrical data stream, the data generator having an output coupled to a modulation input of the phase modulator, wherein the phase modulator modulates the electrical return-to-zero data stream onto the optical signal generated by the optical source, such that a portion of an output of the phase modulator provides the return-to-zero optical data stream.

18. The system of claim 17 wherein the portion of the output of the phase modulator which provides the return-to-zero optical data stream is a Stokes portion of an output spectrum of the modulator.

19. The system of claim 17 wherein the portion of the output of the phase modulator which provides the return-to-zero optical data stream is an anti-Stokes portion of an output spectrum of the modulator.

20. The system of claim 17 wherein the data transmitter includes an optical filter for filtering the output of the phase modulator to provide the return-to-zero optical data stream.

* * * * *